United States Patent

[11] 3,615,700

| [72] | Inventor | Edmund C. Kornfeld<br>Indianapolis, Ind. |
|---|---|---|
| [21] | Appl. No. | 742,490 |
| [22] | Filed | July 5, 1968 |
| [45] | Patented | Oct. 26, 1971 |
| [73] | Assignee | Eli Lilly and Company<br>Indianapolis, Ind. |

[54] α-TETRAZOLYL-6-SUBSTITUTED-TRYPTAMINE AND α-TETRAZOLYL-5,6-DISUBSTITUTED-TRYPTAMINE SWEETENING COMPOSITIONS AND THEIR USE
11 Claims, No Drawings

[52] U.S. Cl. .................................................. 99/141 A,
260/326.14, 260/308
[51] Int. Cl. ...................................................... A61k 7/16,
A61k 27/00, A23l 1/26

[50] Field of Search ............................................ 260/308 D,
308; 99/141 A; 424/269

[56] References Cited
UNITED STATES PATENTS

| 3,294,551 | 12/1966 | Herbst ........................ | 99/141 |
| 3,515,727 | 6/1970 | Garbrecht .................... | 99/141 X |
| 3,535,336 | 10/1970 | Kornfeld ...................... | 99/141 X |

Primary Examiner—Morris O. Wolk
Assistant Examiner—Warren Bovee
Attorneys—Everet F. Smith and Kathleen R. Schmoyer ABSTRACT: α-Tetrazolyl-6-substituted-tryptamine and α-tetrazolyl-5,6-disubstituted-tryptamine compounds useful as nonnutritive sweetening agents, and intermediates for the preparation thereof.

α-TETRAZOLYL-6-SUBSTITUTED-TRYPTAMINE AND α-TETRAZOLYL-5,6-DISUBSTITUTED-TRYPTAMINE SWEETENING COMPOSITIONS AND THEIR USE

SUMMARY OF THE INVENTION

The present invention is directed to compounds of the following formula

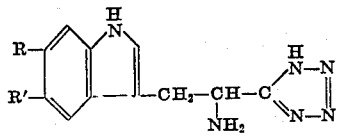

and their nontoxic physiologically acceptable salts, wherein R represents halo of an atomic weight of less than 85, loweralkyl, loweralkoxy, or trifluoromethyl; and, R being trifluoromethyl, R' represents hydrogen, or R being halo as defined, loweralkyl, or loweralkoxy, R' represents hydrogen, halo as defined, loweralkyl, or loweralkoxy.

The d-enantiomers of these compounds and corresponding salts are useful as nonnutritive sweetening agents; hence the present invention is also directed to methods employing these compounds as nonnutritive sweetening agents, and to compositions useful in implementing these methods. The l-enantiomers can be utilized as starting materials from which the d-enantiomers can be prepared.

The present invention is also directed to novel intermediates useful in the preparation of the foregoing products of the present invention.

DETAILED DESCRIPTION OF THE INVENTION

As above set forth, the present invention is directed to compounds of the following formula:

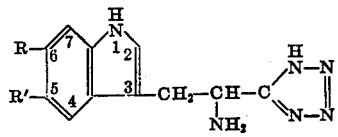

and their nontoxic physiologically acceptable salts, wherein R represents halo of an atomic weight of less than 85, loweralkyl, loweralkoxy, or trifluoromethyl; and, R being trifluoromethyl, R' represents hydrogen, or R being halo as defined, loweralkyl, or loweralkoxy, R' represents hydrogen, halo as defined, loweralkyl, or loweralkoxy. In the present specification and claims, the terms "loweralkyl" and "loweralkoxy" are employed to designate alkyl and alkoxy radicals of from 1 to 4, both inclusive, carbon atoms.

The compounds of the present invention are typically crystalline solid materials. The solubility of the compounds varies. Those which are salts are generally of moderate solubility in water and of lesser solubility in organic solvents, whereas those which are not salts are of only low to moderate solubility in water, but of higher solubility in organic solvents. As water solubility is desirable in the typical usage of a substance as a sweetening agent, the salts are often preferred.

The identity of the salt-forming moiety is not critical except that the salt be nontoxic and physiologically acceptable. Alkaline salt formation occurs at the site of the tetrazolyl proton; suitable alkaline salts are the ammonium, sodium, potassium, calcium, and magnesium salts. Acid salt formation occurs at the amino nitrogen atom, the ring nitrogen atoms being only weakly basic. The identity of the acid salt-forming moiety is not critical, although it is necessary that the acid be a strong acid, that is, an acid having a pH of, numerically, below about 2.2 at a concentration of 0.1N. Suitable strong acids are hydrochloric, hydrobromic, hydroiodic, sulfuric, tartaric, malic, and the like.

"Tryptamine" is the common name given to the compound of the following structural formula:

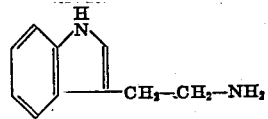

For convenience, all intermediates and products of the present invention which share the essential moieties of tryptamine are named as derivatives of tryptamine. Those starting materials which do not contain the essential moieties of tryptamine are named otherwise, e.g., the 6-substituted indoles and the 6-substituted-3-(diethylaminomethyl)indoles.

The free base compounds of the present invention are prepared in accordance with the following reaction sequence:

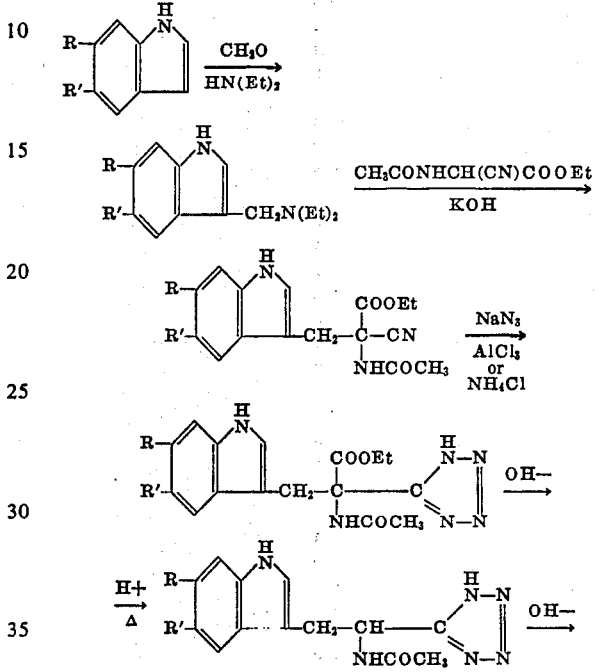

Thus, in accordance with the foregoing reaction sequence, a 6-substituted indole is caused to undergo a typical Mannich reaction with formaldehyde and diethylamine and the resulting 6-substituted 3-(diethylaminomethyl)indole is then condensed with ethyl α-acetamido-α-cyanoacetate, to form the corresponding N-acetyl-α-cyano-α-carboethoxy-6-substituted tryptamine. Reaction thereof with sodium azide and aluminum chloride, or preferably, where R or R' is loweralkyl or loweralkoxy, with sodium azide and ammonium chloride, followed by decarboxylation and hydrolysis of the resulting intermediate, produces the corresponding α-tetrazolyl-6-substituted-tryptamine compound.

The compounds obtained in these methods can thereafter be reacted further to obtain corresponding salts. In such further reactions, the desired compound is reacted with a stoichiometric amount of a suitable acid or base to procure the corresponding salt. These reactions are of a type well known in the art, and the particular steps employed to prepare the present salts are carried out in accordance with procedures well known in the art, and the particular steps employed to prepare the present salts are carried out in accordance with procedures well known in the art for such reactions. Thus, all of the substances to be employed in accordance with the present invention are prepared as described hereinabove.

Resolution of the compounds of the present invention is not necessary, the racemic mixture itself being quite active as a nonnutritive sweetener. However, the d-form is the active moiety; therefore, resolution may be preferred to lessen the amount of substance needed for the desired sweetening effect. Moreover, due to the fact that typically only the l-form of amino acids is metabolized by the mammalian body, usage of the d-form, alone, may be preferred to preclude any opportunity for the mammalian body to incorporate the substance.

When, for these or any other reasons, it is desired to employ only the d-form, resolution of the racemic mixture can be achieved by procedures known in the prior art for the resolution of unsubstituted tryptophan. Three such procedures are discussed and exemplified in detail in *Chemistry of the Amino*

*Acids*, Greenstein et al., Vol. 3, page 2341 and following (John Wiley and Sons, Inc., New York, 1961); particular attention is directed to the first two of these (illustrative procedure 39-5 and illustrative procedure 39-6).

In the 1-enantiomorphic form, the compounds of the present invention are useful in that they can be racemized to obtain a mixture of d and l enantiomorphs. The racemization can be carried out by known chemical or enzymatic means, and the resulting racemic mixture can then be employed as a starting material from which, by resolution, the d-enantiomorphic form useful as a nonnutritive sweetener is procured. Thus, both the d- and l-enantiomorphic forms are useful substances. For chemical and enzymatic means by which racemization is carried out, attention is directed to *Advanced Organic Chemistry*, Fieser and Fieser (Reinhold Publishing Corp., N.Y., 1961), page 90; *Outlines of Biochemistry*, Cortner (Wiley and Sons, Inc., N.Y., 1949), pages 299-300; and *Molecular Biochemistry*, Kosower (McGraw-Hill, N.Y., 1962), pages 121-122.

Representative compounds of the present invention include the following:

d-α-5-tetrazolyl-6-chlorotryptamine
dl-α-5-tetrazolyl-6-(trifluoromethyl)tryptamine
l-α-5-tetrazolyl-6-chlorotryptamine
dl-α-5-tetrazolyl-6-bromotryptamine
dl-α-5-tetrazolyl-5-chloro-6-methyltryptamine
l-α-5-tetrazolyl-6-methyltryptamine
d-α-5-tetrazolyl-6-fluorotryptamine
dl-α-5-tetrazolyl-6-ethyltryptamine
dl-α-5-tetrazolyl-5,6-dichlorotryptamine
d-α-5-tetrazolyl-5-fluror-6-methyltryptamine
dl-α-5-tetrazolyl-5-chloro-6-bromotryptamine
dl-α-5-tetrazolyl-5-fluoro-6-chlorotryptamine
dl-α-5-tetrazolyl-5,6-dimethyltryptamine d-α-5-tetrazolyl-5,6-dimethyltryptamine
dl-α-5-tetrazolyl-5-bromo-6-methyltryptamine
dl-α-5-tetrazolyl-5-methyl-6-bromotryptamine
dl-α-5-tetrazolyl-5-bromo-6-chlorotryptamine
dl-α-5-tetrazolyl-6-chlorotryptamine
dl'α-5-tetrazolyl-5,6dibromotryptamine
dl-α-5-tetrazolyl-6-n-propyltryptamine
dl-α-5-tetrazolyl-6-isopropyltryptamine
dl-α-5-tetrazolyl-6-n-propoxytryptamine
dl-α-5-tetrazolyl-5,6-dichlorotryptamine hydrochloride
dl-α-5-tetrazolyl-6-n-propyltryptamine sulfate
dl-α-5-tetrazolyl-5-dimethyltryptamine nitrate
d-α-5-tetrazolyl-5,6-difluorotryptamine
dl-α-5-tetrazolyl-6-tert-butyltryptamine
dl-α-5-tetrazolyl-5-methyl-6-fluorotryptamine
d-α-5-tetrazolyl-6-chlorotryptamine citrate
dl-α-5-tetrazolyl-5-fluoro-6-bromotryptamine
d-α-5-tetrazolyl-6-chlorotryptamine hydrochloride
dl-α-5-tetrazolyl-5-bromo-6-fluorotryptamine
dl-α-5-tetrazolyl-5,6-dimethyltryptamine hydrochloride As set forth above, the compounds of the present invention are useful in the d-enantiomorphic form as nonnutritive sweetening agents. Hence, in one of its embodiments, the present invention is directed to a method of sweetening an orally acceptable substance, which method comprises the step of adding to the substance a sweetening agent which is the d-enantiomorph of a substituted tryptamine compound of the formula:

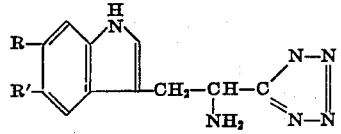

or a nontoxic physiologically acceptable salt thereof, wherein R and R' are as hereinabove defined. In a second aspect, the present invention is directed to a method which comprises administering essentially simultaneously to an animal an orally acceptable substance and an effective amount of a sweetening agent which is the d-enantiomorph of a substituted tryptamine compound of the formula set forth above. In yet another aspect, the present invention is directed to a composition comprising a preferred orally acceptable substance, a flavoring agent, and an effective amount of a sweetening agent which is the d-enantiomorph of the substituted tryptamine compound as above defined.

The identity of the orally acceptable substance in accordance with the present invention is not critical. In general, the term "orally acceptable substance" is employed herein to designate any substance which is taken partially or totally into the mouth cavity and which in this context is without any direct substantial toxicity. The substance can be one which is retained in or on the mouth only temporarily, such as, for example, chewing gum, toothpaste, lip cosmetics, mouthwash, mouthspray, substances used in dentistry for cleansing of teeth, denture treating substances, chewing tobacco and other tobacco products, or the like. Pet toys, for example, rubber dog bones, as well as other mechanical devices temporarily retained within the mouth, are also orally acceptable substances in accordance with the present invention. Similarly, glues and adhesives, as for use on stamps and envelopes, are orally acceptable substances in accordance with the present invention. Alternatively, the orally acceptable substance can be one which is not only taken into the mouth cavity, but which, with or without mastication, is swallowed.

While the orally acceptable substance in accordance with the present invention can be any of a broad range of substances, as set forth above, including mechanical structures, a preferred orally acceptable substance is one which is a flavoring agent. The flavoring agent can be one which is an inherent part of a natural food; or the flavoring agent can be one specifically added to a substance, as, for example, a flavoring agent added to a chewing gum. This dual usage of the term "flavoring agent" as identifying either a food, or a substance added to a food, is in accordance with the terminology of this art (see *Kirk-Othmer Encyclopedia of Chemical Technology*, 2nd Edition, Interscience Publishers, Division of John Wiley and Sons, Inc., New York, 1966, Volume 9, page 347 and following).

There are, of course, numerous orally acceptable substances wherein the sole or main ingredient, other than inert substances such as water, thickening agents, and the like, is a flavoring agent. Attention is directed to coffee and tea. Thus, in accordance with the present invention, coffee, tea, fruit ades, or similar nonnutritive liquids of which the essential characteristic is a flavoring agent, can be sweetened with the present active agent. Furthermore, there are nonnutritive solid or semisolid compositions such as salad dressings of which an essential constituent is a flavoring agent. Such compositions can be sweetened with the present active agent. The active agent can also be added to carbonated beverages of which a primary ingredient, or sole ingredient other than carbonated water, is a flavoring agent. In this sense, "flavoring agent" is used to describe a substance which has a discernible and desirable flavor at a concentration of 250 p.p.m. or less in liquids, even though in other specialized applications, such as chewing gum, and highly flavored baked goods, higher concentrations may be used.

Representative flavoring agents include spices and herbs; the essential oils and their extracts; fruit-derived flavorings; plant extracts, as, for example, cola, caffeine, etc.; and synthetic flavorings, including those which simulate or duplicate the effective components of the flavoring agents of the previous categories. Attention is directed to *Food Technology*, 19, part 2, page 155 (1965), which lists substances generally recognized as safe for food additive purposes, including flavoring agents as well as other food additives which serve as bulking agents, etc.

The flavoring agent with which the present sweetening agent is combined can also be a nutritive component of a food. In this sense, then, the present invention is directed to formulations comprising the present sweetening agent, plus a food comprising, as an inherent part thereof, a flavoring agent.

Thus, for example, the food can be a nutritive solid. Such nutritive solid can be any of a great variety of foods, including baked goods such as bread, crackers, pretzels, pastries, or cake; cereal products; milk derived products, such as ice cream, ice milk, sherberts, custards and other puddings; jello and gelatin products; and processed vegetables and fruits, such as, for example, canned tomatoes, frozen vegetables, and the like. Such nutritive solid foods include meat products in which a sweetening substance is incorporated during processing, such as ham and bacon. The nutritive solid in accordance with this invention also comprehends prepared "mixes" such as mixes for puddings, cakes, pastries, and the like; and confectionary products, for example popcorn, peanut candies, chocolate candies, jellybeans, gumdrops, candy cigarettes, taffy, licorice, and the like. Furthermore, in accordance with the present invention, the term nutritive solid is inclusive of natural sugars, glycine and other amino acids which are nutritive. The nutritive solid can also be a feed, such as a grain-type feed, silage, or other feed, for lower, warmblooded animals. The present active agent can also be added to specialized types of lower, warmblooded animal feeds, such as salt licks, and can be used in baits as an attractant. In the instance of feeds for domestic animals such as dogs, the active agent can be added to regular feeds or to pet snack-type foods.

The food which comprises the flavoring agent can also be a nutritive liquid. Representative nutritive liquids include fruit and vegetable juices; alcoholic beverages such as beer, wine, cocktails and cocktail mixes; milk beverages such as milkshakes, "nogs," and the like; and where nutritive in character, carbonated beverages containing flavorings.

The present active agent can also be combined with a medicinal substance as an orally acceptable substance. Such medicinal substances can be a solid, such as a tablet, capsule, powder, or lozenge, such as a cough drop. The medicinal substance can also be a liquid; for example, an elixir, syrup, suspension, and the like. In this sense, "medicinal substance" is inclusive of veterinary substances for lower, warmblooded animals.

The method of administration is not critical. The present nonnutritive agent is conveniently formulated as a tablet or capsule, and in this form, is especially suited for use with liquid substances. Thus, for example, the desired benefits of the present invention are obtained by adding a tablet of appropriate amount to a liquid, such as, for example, coffee. Such addition can be done on an individualized per-cup or per-glass basis. The present nonnutritive agent is equally well adapted to be formulated as a liquid formulation, typically an aqueous formulation, a suitable amount of which can be added to a solid or liquid food, and mixed therewith prior to consumption. In addition, the present nonnutritive sweetener is conveniently prepared as a free-flowing powder, which can then be shaken over and, if desired, mixed into an orally acceptable substance. It is, of course, also possible to incorporate the present active agent in prepared mixes such as cake mixes, pudding mixes and the like, for home or industrial food preparation usage. Furthermore, the present nonnutritive sweetener can be employed in the processing of substances which are orally acceptable initially or after processing; as examples, ham and tobacco products are mentioned.

In order that the present active agent give the desired sweetening effect to the orally acceptable substance, it is necessary that the nonnutritive sweetener be taken into the mouth cavity at essentially the same time as the orally acceptable substance is taken into the mouth cavity. It is preferred that the substance and the sweetening agent be mixed before being taken into the mouth, but this is not critical.

The amount of the present nonnutritive sweetener to be employed is not critical so long as an effective amount is used. Generally, an effective amount is that amount which provides a sense of sweetness comparable to that afforded by sucrose at a given usage rate. Sucrose, of course, is used in a very wide range of concentrations in various orally acceptable substances. Thus, for example, in confectionary products sucrose concentration may approach 100 percent, whereas in many common foods and liquids, the sucrose concentration may be as low as 1 percent or lower. Correspondingly, the amount of the present active agent which will provide sweetness equivalent to that afforded by sucrose also varies widely. The amount of the present active agent to be used will also depend upon such variables as the particular animal to which it is being administered, the purpose of sweetening and other factors. For sucrose concentrations of from about 6.5 percent to 45 percent, concentrations which include most food and even many confectionary applications, the present active agent, when substituted for sucrose, gives approximately equivalent sweetness at concentrations of from about 0.05 to 30 percent, as the racemic mixture. Where the d-enantiomorph is employed alone, these rates can be reduced by a factor of about one-half. Higher or lower concentrations of the active agent of the present invention can be used where the desired degree of sweetness, by a sucrose standard, is greater or lesser. However, usage of a high concentration of any nonnutritive sweetener generally increases the incidence of off-flavor and other undesirable side effects; for this reason, where a high degree of sweetness is desired, it is generally preferred to use a combination of the present active agent with one or more other known nonnutritive sweeteners.

Known nonnutritive sweeteners with which the nonnutritive sweetener of the present invention can be suitably combined include saccharin and substituted saccharin compounds, conveniently employed in salt form; cyclamic acid (cyclohexylsulfamic acid) and substituted cyclamic acids, also conveniently employed in salt form; 5-(3-hydroxyphenoxy)-1H-tetrazole, suitably employed as the sodium, calcium, potassium, or ammonium salt; and the dihydrochalcone-type sweeteners of U.S. Pat. No. 3,087,821, as well as the related compounds described by Krbechecks et al. (*J. Ag. and Food Chem.*, Vol. 16, No. 1, page 108 (1968). When the active agent of the present invention is employed in combination with one or more of the foregoing previously known nonnutritive sweeteners, the exact ratio of the combination is not critical and can vary considerably. Synergism is sometimes noted, permitting a reduction of the amounts when employed in combination.

Good results are generally obtained with combinations containing the present active agent, on the one hand, and the known nonnutritive sweetener, on the other hand, in a ratio ranging from 1:50 to 50:1, by weight. A preferred ratio is that ranging from 1:5 to 5:1, by weight.

It is known that the use of saccharin as a sweetening agent is accompanied by bitter aftertaste, experienced by a certain portion of the population. Since for many applications, the substance is ideally suited to usage as a sweetener, methods of diminishing the aftertaste have been studied. Attention is directed to British Pat. No. 1,091,154 and to U.S. Pat. No. 3,329,508 as examples. Therefore, in those unusual situations wherein administration of the active agent in accordance with the present invention is accompanied by aftertaste, known methods of diminishing such aftertaste can be utilized. Furthermore, such methods can also be used where the present active agent is combined with saccharin and/or other nonnutritive sweeteners.

It is also possible to combine the present active agent with sucrose or other nutritive sweeteners, so as to obtain a sweetening substance of merely reduced caloric value. Such substance can be formulated by known procedures as a foam, the purpose being to increase the bulk so that a given amount of the foam has a sweetness equivalent to the same amount of sugar, alone.

A preferred group of sweeteners in accordance with the present invention are those of the formula

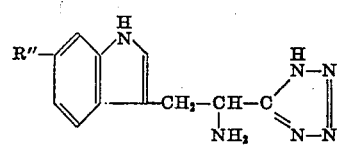

or their nontoxic physiologically acceptable salts, wherein R'' is chloro, fluoro, or methyl, and a particularly preferred sweetener is α-5-tetrazolyl-6-chlorotryptamine.

The 6-substituted indole serving as starting materials in accordance with the present invention

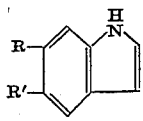

are readily prepared by methods known in the art. One such method is that of Rydon et al., *J. Chem. Soc.*, (1955), 3499. In this method, a correspondingly substituted o-nitrotoluene is condensed with ethyl oxalate and the resulting substituted nitrophenyl-pyruvic acid reductively cyclized to yield the correspondingly substituted 2-indolecarboxylic acid. This acid is then decarboxylated to obtain the substituted indole which serves as starting material in accordance with the present invention. A second method comprises the cyclization of suitably substituted phenyl-hydrazines, themselves prepared by the method of Bullock et al., *J. Am. Chem. Soc.*, 78, 5854 (1956).

The 6-substituted indole is then caused to undergo a typical Mannich reaction with formaldehyde and diethylamine to obtain the corresponding 6-substituted 3-(diethylaminomethyl)indole. In a representative such Mannich reaction, 7.53 grams of diethylamine (0.15 mole) in 22.5 ml. of cold 60 percent acetic acid were mixed with 8.25 ml. of 37 percent aqueous formaldehyde. 6-(Trifluoromethyl)indole (19.0 grams; 0.10 mole) was then added, and the resulting mixture warmed to 60° C. After 2 hours at this temperature, the solution was poured into 360 ml. of 2N sodium hydroxide, and the desired 3-(diethylaminomethyl)-6-(trifluoromethyl)indole product extracted with ether. The extract was dried, and solvent removed by distillation to separate the product, which was an oil.

The following examples illustrate the present invention and will enable those skilled in the art to practice the same.

EXAMPLE 1 dl-N-Acetyl-α-cyano-α-carboethoxy-6-chlorotryptamine 3-(Diethylaminomethyl)-6-chloroindole (8.0 grams; about 0.3 mole), ethyl α-acetamido-α-cyanoacetate (7.5 grams; about 0.44 mole), and powdered potassium hydroxide (6.5 grams) in 35 milliliters of toluene were refluxed for 1 hour under nitrogen. The reaction mixture was then cooled to room temperature, resulting in the precipitation of the desired ethyl dl-N-acetyl-α-cyano-α-carboethoxy-6-chlorotryptamine product. The product was separated by filtration and washed with toluene, water, ethanol, and ether, to yield 7.2 grams of material. A sample was recrystallized from ethanol, m.p., 205°–210° C.

Analysis, Calc. for $C_{16}H_{16}ClN_3O_3$:
C, 57.57;
H, 4.83;
N, 12.59.
Found: C, 57.65;
H, 4.88;
N, 12.37.

EXAMPLE 2 dl-N-Acetyl-α-carboethoxy-α-5-tetrazolyl-6-chlorotryptamine

A solution of 2.8 grams of anhydrous alumina chloride in 45 milliliters of tetrahydrofuran was added to a stirred suspension of 4.5 grams of sodium azide (about 0.07 mole) in 10.5 milliliters of the same solvent. The mixture was refluxed for 1 hour and then cooled to 25° C. dl-N-Acetyl-α-carboethoxy-6-chlorotryptamine (6.94 grams, about 0.018 mole), was added, and the mixture was heated under reflux for 24 hours. Water (32 milliliters) and concentrated hydrochloric acid (10.5 milliliters) were added with cooling. The aqueous layer was separated and extracted with 40 milliliters of 1:1 ether/tetrahydrofuran. The organic layers were combined, washed with water, and dried over magnesium sulfate, and the solvents were distilled to yield the desired dl-N-acetyl-α-carboethoxy-α-5-tetrazolyl-6-chlorotryptamine. The crude product was recrystallized from chloroform, yielding 7.3 grams, m.p., 160° C.

Analysis, Calc. for $C_{15}H_{17}ClN_6O_3$:
C, 49.38;
H, 4.70;
N, 23.04.
Found: C, 48.89;
H, 4.61;
N, 22.30.

EXAMPLE 3 dl-N-Acetyl-α-5-tetrazolyl-6-chlorotryptamine

A solution of dl-N-acetyl-α-carboethoxy-α-5-tetrazolyl-6-chlorotryptamine (7.3 grams; 0.02 mole) and 3.2 grams NaOH in 30 milliliters of water was refluxed for 3 hours. The mixture was then cooled, and acidified with 10 milliliters concentrated hydrochloric acid, and the crude acid (dl-N-acetyl-α-carboxy-α-5-tetrazolyl-6-chlorotryptamine) was separated by filtration and washed with water. It was then decarboxylated by heating in 200 milliliters or water for 2 hours. The solution was cooled, and the product was filtered, to yield 2.26 grams of the desired dl-N-acetyl-α-5-tetrazolyl-6-chlorotryptamine. A sample of this product was recrystallized from water, m.p., 251°–55° C.

Analysis, Calc. for $C_{13}H_{13}ClN_6O$:
C, 51.23;
H, 4.30;
N, 27.58.
Found: C, 51.18;
H, 4.37;
N, 27.18.

EXAMPLE 4 dl-α-5-Tetrazolyl-6-chlorotryptamine

A solution of dl-N-acetyl-α-5-tetrazolyl-6-chlorotryptamine (2.0 grams; about 0.01 mole) in 25 milliliters of water containing 2 grams of sodium hydroxide was heated under reflux for 12 hours. The mixture was cooled and acidified to pH 5 with hydrochloric acid, to precipitate the desired dl-α-5-tetrazolyl-6-chlorotryptamine product. The product was separated by filtration, washed with water, and recrystallized from acetic acid, m.p., 271°–74° C.(d).

Analysis, Calc. for $C_{11}H_{11}ClN_6$:
C, 50.28;
H, 4.22;
N, 31.99.
Found: C, 50.09;
H, 4.28;
N, 31.58.

EXAMPLE 5 dl-nN-Acetyl-α-cyano-α-carboethyoxy-6-fluorotryptamine dl-N-Zcetyl-α-cyano-α-carboethoxy-6-fluorotryptamine, m.p., 178°–80° C., was prepared in accordance with the procedures of example 1 from 3-(diethylaminomethyl)-6-fluoroindole.

Analysis, Calc. for $C_{16}H_{16}FN_3O_3$:
C, 60.55
H, 5.08
N, 13.25
Found: C, 60.35
H, 4.95;
N, 13.01.

EXAMPLE 6 dl-N-Acetyl-α-carboethoxy-α-5-tetrazolyl-6-fluorotryptamine, dl-N-Acetyl-α-carboethoxy-α-5-tetrazolyl-6-fluorotryptamine, m.p.,215°–17° C., was prepared in accordance with the procedures of example 2 from DL-N-acetyl-α-cyano-α-carboethoxy-6fluorotryptamine.

Analysis, Calc. for $C_{16}H_{17}FN_6O_3$:

|  | C, 53.32; |
|---|---|
|  | H, 4.76; |
|  | N, 23.32. |
| Found: | C, 53.61; |
|  | H, 4.87; |
|  | N, 23.39. |

EXAMPLE 7 dl-α-5-Tetrazolyl-6-fluorotryptamine

In accordance with the procedures of example 3, dl-N-acetyl-α-carboethoxy-α-5-tetrazolyl-6-fluorotryptamine was reacted with sodium hydroxide and thereafter worked up in accordance with the procedures of example 3, yielding the corresponding dl-N-acetyl-α-carboxy-α-5-tetrazolyl-6-fluorotryptamine. This product was then decarboxylated as in example 3 and hydrolyzed as in example 4, yielding dl-α-5-tetrazolyl-6-fluorotryptamine, m.p., 267°–70° C.

| Analysis, Calc.: | C, 53.64; | N, 34.13; | H, 4.50. |
|---|---|---|---|
| Found; | C, 53.37; | N, 33.88; | H, 4.59. |

EXAMPLE 8 dl-α-5-Tetrazolyl-6-methoxytryptamine dl-α-5-Tetrazolyl-6-methoxytryptamine was prepared from 3-(diethylaminomethyl)-6-methoxyindole. The preparation was carried out in accordance with the procedures of examples 1–4 except that in the reaction of the intermediate dl-N-acetyl-α-cyano-α-carboethoxy-6-methoxytryptamine to obtain the corresponding dl-N-acetyl-α-carboethoxy-α-5-tetrazolyl-6-methoxytryptamine intermediate, ammonium chloride was employed instead of aluminum chloride. The product so obtained melted at 264°–67° C.

| Analysis, Calc.: | C, 55.80; | N, 32.54; | H, 5.46. |
|---|---|---|---|
| Found: | C, 55.32; | N, 30.77; | H, 5.86. |

EXAMPLES 9–12

3-(Diethylaminomethyl)-6-(trifluoromethyl)indole is reacted with ethyl α-acetamido-α-cyanoacetate to yield dl-N-acetyl-α-cyano-α-carboethoxy-6-(trifluoromethyl)tryptamine, which is then treated with sodium azide and aluminum chloride to obtain dl-N-acetyl-α-carboethoxy-α-5-tetrazolyl-6-(trifluoromethyl)-tryptamine. This latter intermediate is then treated in accordance with the procedures of example 3 to yield dl-N-acetyl-α-5-tetrazolyl-6-(trifluoromethyl)tryptamine, which is hydrolyzed in accordance with the procedures of example 4 to obtain the final product, dl-α-5-tetrazolyl-6-(trifluoromethyl)tryptamine.

EXAMPLES 13–16

3-(Diethylaminomethyl)-6-bromoindole is reacted with ethyl α-acetamido-α-cyanoacetate to yield dl-N-acetyl-α-cyano-α-carboethoxy-6-bromotryptamine, which is then treated with sodium azide and aluminum chloride to obtain dl-N-acetyl-α-carboethoxy-α-5-tetrazolyl-6-bromotryptamine. This latter intermediate is then treated in accordance with the procedures of example 3 to yield dl-N-acetyl-α-5-tetrazolyl-6-bromotryptamine, which is hydrolyzed in accordance with the procedures of example 4 to obtain the final product, dl-α-5-tetrazolyl-6-bromotryptamine.

EXAMPLES 17–20

3-(Diethylaminomethyl)-6-methylindole is reacted with ethyl α-acetamido-α-cyanoacetate to yield dl-N-acetyl-α-cyano-α-carboethoxy-6-methyltryptamine, which is then treated with sodium azide and ammonium chloride to obtain dl-N-acetyl-α-carboethoxy-α-5-tetrazolyl-6methyltryptamine. This latter intermediate is then treated in accordance with the procedures of example 3 to yield dl-N-acetyl-α-5-tetrazolyl-6-methyltryptamine, which is hydrolyzed in accordance with the procedures of example 4 to obtain the final product, dl-α-5-tetrazolyl-6-methyltryptamine.

EXAMPLES 21–24

3-(Diethylaminomethyl)-6-ethylindole is reacted with ethyl α-acetamido-α-cyanoacetate to yield dl-N-acetyl-α-cyano-α-carboethoxy-6-ethyltryptamine, which is then treated with sodium azide and ammonium chloride to obtain dl-N-acetyl-α-carboethoxy-α-5-tetrazolyl-6-ethyltryptamine This latter intermediate is then treated in accordance with the procedures of example 3 to yield dl-N-acetyl-α-5-tetrazolyl-6-ethyltryptamine, which is hydrolyzed in accordance with the procedures of example 4 to obtain the final product, dl-α-5-tetrazolyl-6-ethyltryptamine.

EXAMPLES 25–28

3-(diethylaminomethyl)-5,6-dichloroindole is reacted with ethyl α-acetamido-α-cyanoacetate to yield dl-N-acetyl-α-cyano-α-carboethoxy-5,6-dichlorotryptamine, which is then treated with sodium azide and aluminum chloride to obtain dl-N-acetyl-α-carboethoxy-α-5-tetrazolyl-5,6-dichlorotryptamine. This latter intermediate is then treated in accordance with the procedures of example 3 to yield dl-N-acetyl-α-5-tetrazolyl-5,6-dichlorotryptamine, which is hydrolyzed in accordance with the procedures of example 4 to obtain the final product, dl-α-5-tetrazolyl-5,6-dichlorotryptamine.

EXAMPLES 29–32

3-(Diethylaminomethyl)-5-fluoro-6-methylindole is reacted with ethyl α-acetamido-α-cyanoacetate to yield dl-N-acetyl-α-cyano-α-carboethoxy-5-fluoro-6-methyltryptamine, which is then treated with sodium azide and ammonium chloride to obtain dl-N-acetyl-α-carboethoxy-α-5-tetrazolyl-5-fluoro-6-methyltryptamine. This latter intermediate is then treated in accordance with the procedures of example 3 to yield dl-N-acetyl-α-5-tetrazolyl-5-fluoro-6-methyltryptamine, which is hydrolyzed in accordance with the procedures of example 4 to obtain the final product, dl-α-5-tetrazolyl-5-fluoro-6-methyltryptamine.

EXAMPLES 33–36

3-(Diethylaminomethyl)-5-chloro-6-bromoindole is reacted with ethyl α-acetamido-α-cyanoacetate to yield dl-N-acetyl-α-cyano-α-carboethoxy-5-chloro-6-bromotryptamine, which is then treated with sodium azide and aluminum chloride to obtain dl-N-acetyl-α-carboethoxy-α-5-tetrazolyl-5-chloro-6-bromotryptamine. This latter intermediate is then treated in accordance with the procedures of example 3 to yield dl-N-acetyl-α-5-tetrazolyl-5-chloro-6-bromotryptamine, which is hydrolyzed in accordance with the procedures of example 4 to obtain the final product, dl-60 -5-tetrazolyl-5-chloro-6-bromotryptamine.

EXAMPLES 37–40

3-(Diethylaminomethyl)-5-fluoro-6-chloroindole is reacted with ethyl α-acetamido-α-cyanoacetate to yield dl-N-acetyl-α-cyano-α-carboethoxy-5-fluoro-6-chlorotryptamine, which is then treated with sodium azide and aluminum chloride to obtain dl-N-acetyl-α-carboethoxy-α-5-tetrazolyl-5-fluoro-6-chlorotryptamine. This latter intermediate is then treated in accordance with the procedures of example 3 to yield dl-N-acetyl-α-5-tetrazolyl-5-fluoro-6-chlorotryptamine, which is hydrolyzed in accordance with the procedures of example 4 to obtain the final product, dl-α-5-tetrazolyl-5-fluoro-6-chlorotryptamine.

EXAMPLES 441-44

3-(Diethylaminomethyl)-5,6-dimethylindole is reacted with ethyl α-acetamido-α-cyanoacetate to yield dl-N-acetyl-α-cyano-α-carboethoxy-5,6-dimethyltryptamine, which is then treated with sodium azide and ammonium chloride to obtain dl-N-acetyl-α-carboethoxy-α-5-tetrazolyl-5,6-dimethyltryptamine This latter intermediate is then treated in accordance with the procedures of example 3 to yield dl-N-acetyl-α-5-tetrazolyl-5,6-dimethyltryptamine, which is hydrolyzed in accordance with the procedures of example 4 to obtain the final product, dl-α-5-tetrazolyl-5,6-dimethyltryptamine.

EXAMPLES 45-48

3-(Diethylaminomethyl)-5-bromo-6-methylindole is reacted with ethyl α-acetamido-α-cyanoacetate to yield dl-N-acetyl-α-cyano-α-carboethoxy-5-bromo-6-methyltryptamine, which is then treated with sodium azide and ammonium chloride to obtain dl-N-acetyl-α-carboethoxy-α-5-tetrazolyl-5-bromo-6-methyltryptamine. This latter intermediate is then treated in accordance with the procedures of example 3 to yield dl-N-acetyl-α-5-tetrazolyl-5-bromo-6-methyltryptamine, which is hydrolyzed in accordance with the procedures of example 4 to obtain the final product, dl-α-5-tetrazolyl-5bromo-6-methyltryptamine.

EXAMPLES 49-52

3-(Diethylaminomethyl)-5-methyl-6-bromoindole is reacted with ethyl α-acetamido-α-cyanoacetate to yield dl-N-acetyl-α-cyano-α-carboethoxy-5-methyl-6-bromotryptamine, which is then treated with sodium azide and ammonium chloride to obtain dl-N-acetyl-α-carboethoxy-α-5-tetrazolyl-5-methyl6-bromotryptamine. This latter intermediate is then treated in accordance with the procedures of example 3 to yield dl-N-acetyl-α-5-tetrazolyl-5-methyl-6-bromotryptamine, which is hydrolyzed in accordance with the procedures of example 4 to obtain the final product, dl-α-5-tetrazolyl-5-methyl-6-bromotryptamine.

EXAMPLES 53-56

3-(Diethylaminomethyl)-5-bromo-6-chloroindole is reacted with ethyl α-acetamido-α-cyanoacetate to yield dl-N-acetyl-α-cyano-α-carboethoxy-5-bromo-6-chlorotryptamine, which is then treated with sodium azide and aluminum chloride to obtain dl-N-acetyl-α-carboethoxy-α-5-tetrazolyl-5-bromo-6-chlorotryptamine. This latter intermediate is then treated in accordance with the procedures of example 3 to yield dl-N-acetyl-α-5-tetrazolyl-5-bromo-6-chlorotryptamine, which is hydrolyzed in accordance with the procedures of example 4 to obtain the final product, dl-α-5-tetrazolyl-5-bromo-6-chlorotryptamine.

EXAMPLES 57-60

3-(Diethylaminomethyl)-6-n-propylindole is reacted with ethyl α-acetamido-α-cyanoacetate to yield dl-N-acetyl-α-cyano-α-carboethoxy-6-n-propyltryptamine, which is then treated with sodium azide and ammonium chloride to obtain dl-N-acetyl-α-carboethoxy-α-5-tetrazolyl-6-n-propyltryptamine. This latter intermediate is then treated in accordance with the procedures of example 3 to yield dl-N-acetyl-α-5-tetrazolyl-6-n-propyltryptamine, which is hydrolyzed in accordance with the procedures of example 4 to obtain the final product, dl-α-5-tetrazolyl-6-n-propyltryptamine.

EXAMPLES 61-64

3-(Diethylaminomethyl)-6-isopropylindole is reacted with ethyl α-acetamido-α-cyanoacetate to yield dl-N-acetyl-α-cyano-α-carboethoxy-6-isopropyltryptamine, which is then treated with sodium azide and ammonium chloride to obtain dl-N-acetyl-α-carboethoxy-α-5-tetrazolyl-6-isopropyltryptamine. This latter intermediate is then treated in accordance with the procedures of example 3 to yield dl-N-acetyl-α-5-tetrazolyl-6-isopropyltryptamine, which is hydrolyzed in accordance with the procedures of example 4 to obtain the final product, dl-α-5-tetrazolyl-6-isopropyltryptamine.

EXAMPLES 65-68

3-(Diethylaminomethyl)-5,6-difluoroindole is reacted with ethyl α-acetamido-α-cyanoacetate to yield dl-N-acetyl-α-cyano-α-carboethoxy-5,6-difluorotryptamine, which is then treated with sodium azide and aluminum chloride to obtain dl-N-acetyl-α-carboethoxy-α-5-tetrazolyl-5,6-difluorotryptamine. This latter intermediate is then treated in accordance with the procedures of example 3 to yield dl-N-acetyl-α-5-tetrazolyl-5,6-difluorotryptamine, which is hydrolyzed in accordance with the procedures of example 4 to obtain the final product, dl-α-5-tetrazolyl-5,6-difluorotryptamine.

EXAMPLES 69-72

3-(Diethylaminomethyl)-5-methyl-6-fluoroindole is reacted with ethyl α-acetamido-α-cyanoacetate to yield dl-N-acetyl-α-cyano-α-carboethoxy-5-methyl-6-fluorotryptamine, which is then treated with sodium azide and ammonium chloride to obtain dl-N-acetyl-α-carboethoxy-α-5-tetrazolyl-5-methyl-6-fluorotryptamine. This latter intermediate is then treated in accordance with the procedures of example 3 to yield dl-N-acetyl-α-5-tetrazolyl-5-methyl-6-fluorotryptamine, which is hydrolyzed in accordance with the procedures of example 4 to obtain the final product, dl-α-5-tetrazolyl-5-methyl-6-fluorotryptamine.

EXAMPLES 73-76

3-(Diethylaminomethyl)-6-ethoxyindole is reacted with ethyl α-acetamido-α-cyanoacetate to yield dl-N-acetyl-α-cyano-α-carboethoxy-6-ethoxytryptamine, which is then treated with sodium azide and ammonium chloride to obtain dl-N-acetyl-α-carboethoxy-α-5-tetrazol-6-ethoxytryptamine. This latter intermediate is then treated in accordance with the procedures of example 3 to yield dl-N-acetyl-α-5-tetrazolyl-6-ethoxytryptamine, which is hydrolyzed in accordance with the procedures of example 4 to obtain the final product, dl-α-5-tetrazolyl-6-ethoxytryptamine.

EXAMPLE 77

An initial evaluation was carried out with various of the compounds serving as active agent in accordance with the present invention. The evaluation comprised the tasting of a small amount of the respective compound, the amount being that which would adhere to a finger tip. Each of the compounds was rated for degree of sweetness and aftertaste, if any. The sweetness ratings were as follows:

| Compound Evaluated | Sweetness Rating |
|---|---|
| dl-α-5-tetrazolyl-6-chlorotryptamine | very sweet |
| dl-α-5-tetrazolyl-6-fluorotryptamine | very sweet |
| dl-α-5-tetrazolyl-6-methoxytryptamine | sweet |

No aftertaste was observed with any of the compounds evaluated.

EXAMPLE 78

In another evaluation, dl-α-5-tetrazolyl-6-chlorotryptamine was tested for its sweetening effect in aqueous solutions. The evaluation enabled comparison with known sweetening agents.

In this evaluation, the compound was dissolved in each of several portions of water, thus obtaining several solutions containing the compound in varying concentrations. In addition, there was prepared an aqueous solution containing 0.10 percent sodium cyclamate and 0.01 percent saccharin, this concentration being equivalent to a 10 percent solution of sucrose. All solutions were of a pH of 6.7.

Thereafter, all solutions were taste tested. Comparison was made between the saccharin/sodium cyclamate solution, as a standard and equivalent to a 10 percent solution of sucrose, and the various solutions of the dl-α-5-tetrazolyl-6-chlorotryptamine. The solution adjudged to be equivalent to the standard solution contained 0.1 percent of the dl-α-tetrazolyl-6-chlorotryptamine. No aftertaste was observed.

EXAMPLES 79–81

Various of the compounds serving as the present active agent were evaluated further, jointly with saccharin. In this evaluation, aqueous solutions were prepared containing saccharin and one of the selected compounds. The concentration of the saccharin in the solutions was uniformly 0.01 percent; the concentration of the selected compound was varied among the solutions. In addition, as in example 78, an aqueous solution containing 0.10 percent of sodium cyclamate and 0.01 percent of sodium saccharin was prepared to serve as a standard equivalent to a 10 percent sucrose solution. All solutions were at a pH of 6.7. As in the evaluation reported in example 78, the solutions containing the test compounds were taste tested. Taste was compared with the standard to determine which concentration of test compound and saccharin was equivalent to the standard. The concentrations of active agent in the solutions judged to be equivalent to the standard are listed in the following table.

| Compound | Percent of Compound in solution |
| --- | --- |
| dl-α-5-tetrazolyl-6-fluorotryptamine | 0.02 |
| dl-α-5-tetrazolyl-6-methoxytryptamine | 0.05 |
| dl-α-5-tetrazolyl-6-chlorotryptamine | 0.015 |

No aftertaste was noted.

EXAMPLES 82–92

Results essentially the same as those reported in example 77 are also achieved with the following compounds:
dl-α-5-tetrazolyl-6-methyltryptamine
dl-α-5-tetrazolyl-6-ethyltryptamine
d-α-5-tetrazolyl-5,6-dichlorotryptamine
dl-α-5-tetrazolyl-5,6-dimethyltryptamine
dl-α-5-tetrazolyl-6-chlorotryptamine hydrochloride
d-α-5-tetrazolyl-6-methyltryptamine sulfate
dl-α-5-tetrazolyl-5-chloro-6-methyltryptamine nitrate
d-α-5-tetrazolyl-5-bromo-6-fluorotryptamine tartrate
dl-α-5-tetrazolyl-6-isopropyltryptamine
d-α-5-tetrazolyl-6-(trifluoromethyl)tryptamine
d-α-5-tetrazolyl-6-ethoxytryptamine

I claim:
1. The method of sweetening an orally acceptable substance which comprises the step of adding to the substance a nonnutritive sweetener which is the d-enantiomorph of a compound of the formula

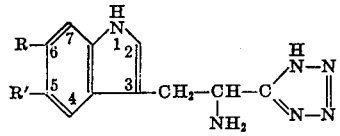

and its nontoxic physiologically acceptable salts, wherein R represents halo of an atomic weight of less than 85, loweralkyl, loweralkoxy, or trifluoromethyl; and, R being trifluoromethyl, R' represents hydrogen, or, R being halo as defined, loweralkyl, or loweralkoxy, R' represents hydrogen, halo as defined, loweralkyl, or loweralkoxy.

2. The method of claim 1 wherein the nonnutritive sweetener is d-α-5-tetrazolyl-6-chlorotryptamine.
3. The method of claim 1 wherein the nonnutritive sweetener is d-α-5-tetrazolyl-6-fluorotryptamine.
4. The method of claim 1 wherein the nonnutritive sweetener is d-α-5-tetrazolyl-6-methyltryptamine.
5. The method of claim 1 wherein the nonnutritive sweetener is d-α-5-tetrazolyl-6-(trifluoromethyl)tryptamine.
6. The method which comprises administering essentially simultaneously to an animal
1. an orally acceptable substance and
2. an effective amount of a nonnutritive sweetener which is the d-enantiomorph of a compound of the formula

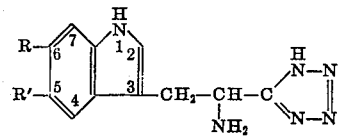

and its nontoxic physiologically acceptable salts, wherein R represents halo of an atomic weight of less than 85, loweralkyl, loweralkoxy, or trifluoromethyl; and, R being trifluoromethyl, R' represents hydrogen, or, R being halo as defined, loweralkyl or loweralkoxy, R' represents hydrogen, halo as defined, loweralkyl, or loweralkoxy.

7. The method of claim 6 wherein the nonnutritive sweetener is d-α-5-tetrazolyl-6-chlorotryptamine.
8. Composition comprising
1. a flavoring agent and
2. an effective amount of a nonnutritive sweetener which is the d-enantiomorph of a compound of the formula

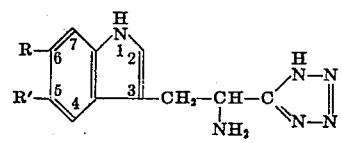

and its nontoxic physiologically acceptable salts, wherein R represents halo of an atomic weight of less then 85, loweralkyl, loweralkoxy, or trifluoromethyl; and, R being trifluoromethyl, R' represents hydrogen, or, R being halo as defined, loweralkyl, or loweralkoxy, R' represents hydrogen, halo as defined, loweralkyl or loweralkoxy.

9. The composition of claim 8 wherein the nonnutritive sweetener is d-α-5-tetrazolyl-6-chlorotryptamine.
10. The composition of claim 8 wherein the nonnutritive sweetener is d-α-5-tetrazolyl-6-methyltryptamine.
11. The composition of claim 8 wherein the nonnutritive sweetener is d-α-5-tetrazolyl-6-(trifluoromethyl)tryptamine.

* * * * *

UNITED STATES PATENT OFFICE
CERTIFICATE OF CORRECTION

Patent No. 3,615,700         Dated October 26, 1971

Inventor(s)  Edmund C. Kornfeld

It is certified that error appears in the above-identified patent and that said Letters Patent are hereby corrected as shown below:

In each occurrence throughout the entire patent, "d", "l", and "dl" should be italicized.

In column 2, just before line 38, the following structural formula should be added:

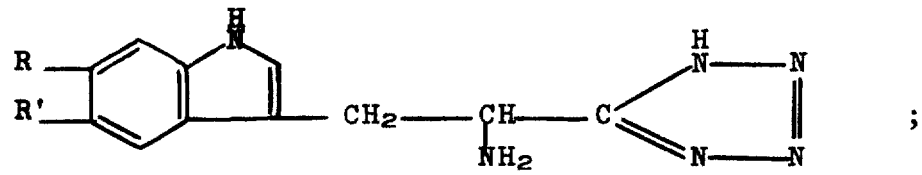

also, in column 2, at lines 57-59, both inclusive, the following text should be deleted: ", and the particular steps employed to prepare the present salts are carried out in accordance with procedures well known in the art".

In column 3 in line 34, the terminal portion of text therein, that is, "d-α-5-tetrazolyl-" should be moved to the subsequent line, line 35, as part of the compound there identified, and the entire compound should be moved to the right so as to be in line with the other compounds in the list; also, in column 3, at about line 41, the compound there identified "dl'α-5-tetrazolyl-5,6dibromotryptamine" should be changed to --dl-α-5-tetrazolyl-5,6-dibromotryptamine--; also, in column 3, at about line 47, "dl-α-5-tetrazolyl-5-dimethyltryptamine nitrate" should be changed to --dl-α-5-tetrazolyl-5,6-dimethyltryptamine nitrate--; also, in column 3, at about lines 63-69, the structural formula on the left-hand side is lacking the position numberings and the tetrazolyl moiety on the right-hand portion is lacking a hydrogen atom; therefore, the formula should read as follows:

PO-1050
(5/69)

UNITED STATES PATENT OFFICE
CERTIFICATE OF CORRECTION

Patent No. 3,615,700               Dated  October 26, 1971

Inventor(s)   Edmund C. Kornfeld

It is certified that error appears in the above-identified patent and that said Letters Patent are hereby corrected as shown below:

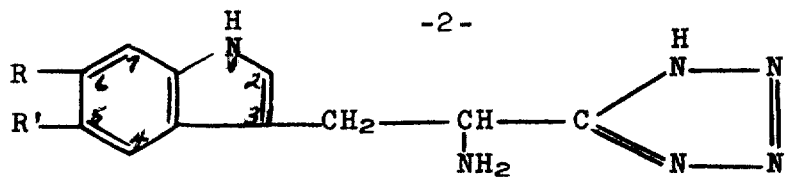

In column 7, line 48, "0.44" should be --0.044--; also, in column 7, line 69, "alumina" should be --aluminum--.

In column 8, line 65, the lower case "n" which is the third letter in the line should be deleted; also, in column 8 at line 66, the word "Zcetyl" should be --Acetyl--.

In column 9 in line 6, "DL" should be --dl--; also, in column 9, in line 7, there should be a hyphen between "6" and the chemical name following it; also, in column 9, the text presently contained in line 26 should be moved back to line 25 and converted to normal size text to complete the text of Example 7.

In column 10, line 2, there should be a hyphen between "6" and the chemical name following it; also, in column 10, at about line 23-24, "diethylaminomethyl" should be given an upper case D to read --Diethylaminomethyl--; also, in column 10, line 60, "dl-60" should be changed to --dl-α--.

In column 11, line 1, "441" should be changed to --41--; also, in column 11 at line 25, a hyphen should be inserted between "5" and the chemical name following it;

Column 11, line 35, insert a hypen between "methyl" and "6".

In column 12, line 38, "tetrazol" should be changed to --tetrazolyl--.

Signed and sealed this 18th day of July 1972.

(SEAL)
Attest:

EDWARD M.FLETCHER,JR.            ROBERT GOTTSCHALK
Attesting Officer                Commissioner of Patents